Feb. 26, 1952     R. A. WILKINSON     2,587,258
BEET CLEANING APPARATUS
Filed March 6, 1950     2 SHEETS—SHEET 1
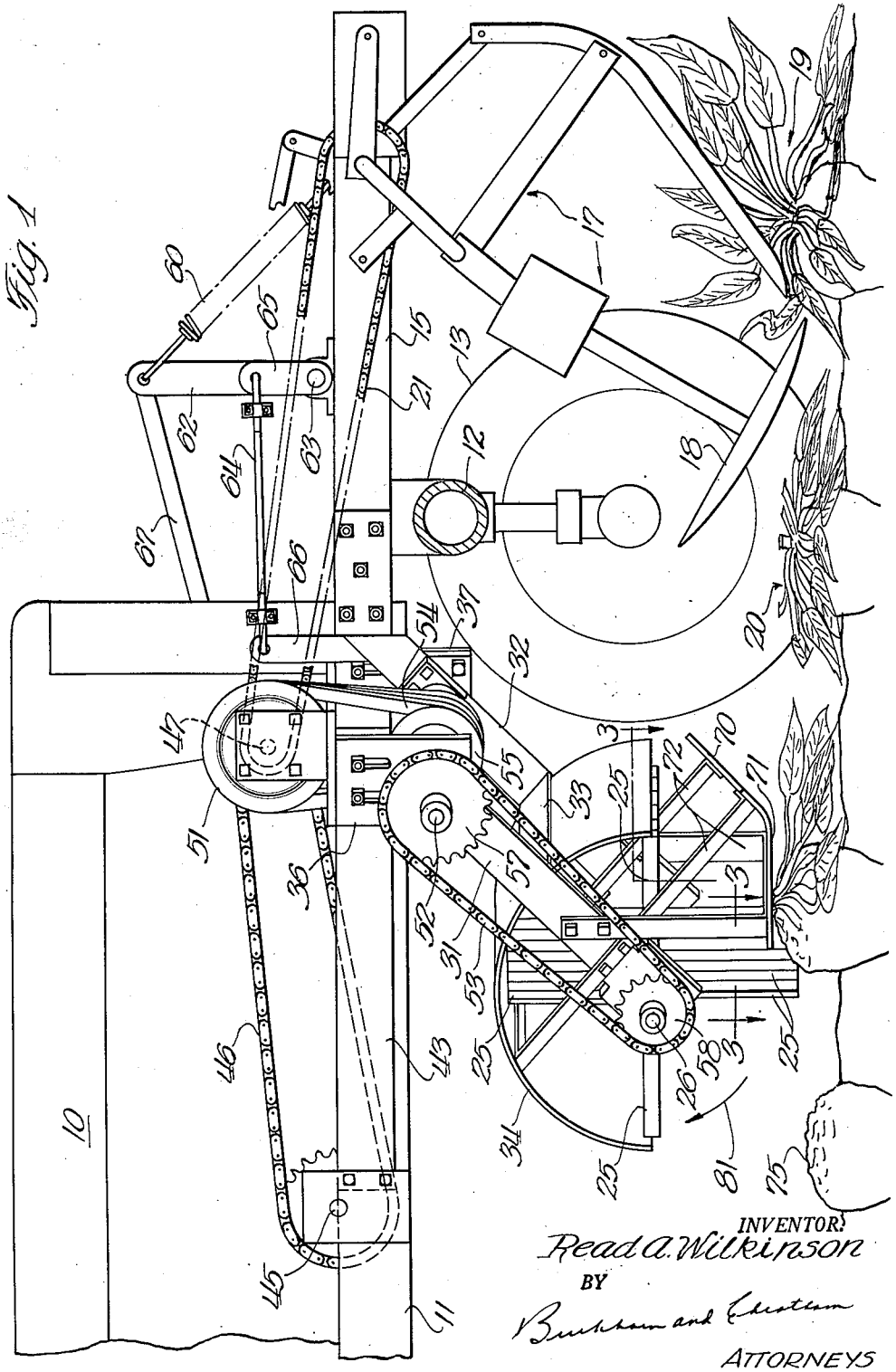
INVENTOR.
Read A. Wilkinson
BY
Buckham and Cheatham
ATTORNEYS Feb. 26, 1952 R. A. WILKINSON 2,587,258
BEET CLEANING APPARATUS
Filed March 6, 1950 2 SHEETS—SHEET 2
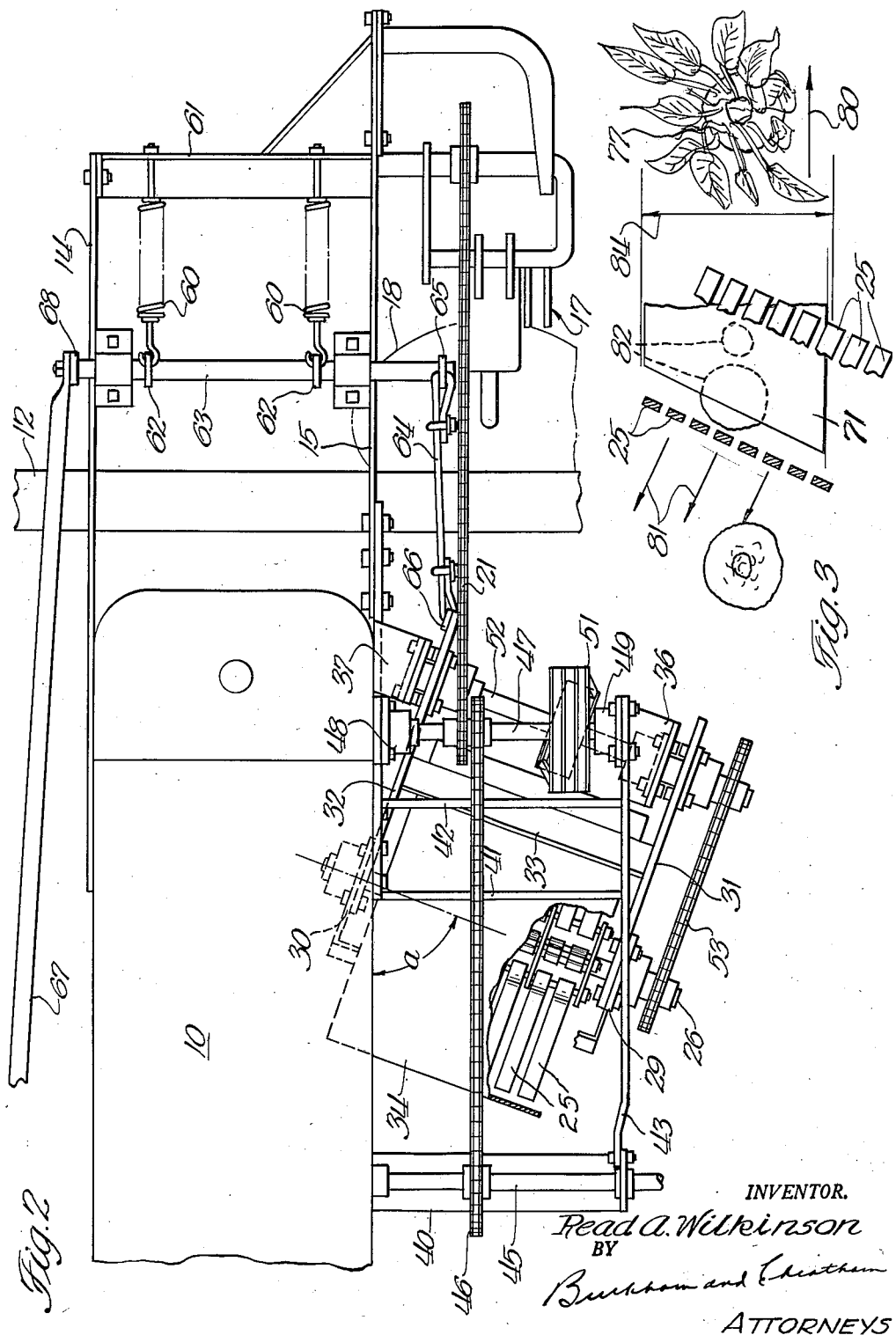
INVENTOR.
Read A. Wilkinson
BY
Burkham and Cheatham
ATTORNEYS Patented Feb. 26, 1952

2,587,258

UNITED STATES PATENT OFFICE 2,587,258

BEET CLEANING APPARATUS

Read A. Wilkinson, Nampa, Idaho

Application March 6, 1950, Serial No. 147,814

5 Claims. (Cl. 56—121.46)

The present invention relates to power driven apparatus for cleaning the tops of beets and the like root vegetables, and more particularly to beet cleaner attachments for beet harvesters.

Beet harvesters for digging beets from the soil are normally provided with a topper at the forward end thereof and while such toppers are effective for removing the greater portion of the leaf tops of the beets, much debris in the form of appendages and dirt is left by such toppers on the top of the beet. If the topper is so adjusted as to cut deeply into the crown of the beet and thus to remove all of the appendages and dirt therefrom, a very considerable proportion of the beet is wasted and the root is damaged to the point that storability of the beets prior to processing is reduced. Cleaners have been devised heretofore for use on beet harvesters consisting of a rotating drum arrangement of flexible flails for whipping the appendages and debris from the upper end portions of beets just before the beets are removed from the ground but such arrangements as have been devised heretofore have not been entirely satisfactory. Reference is made to prior Patents 2,250,948 and 2,354,112 issued July 29, 1941, and July 18, 1944, respectively, to Jonathan Garst, and both entitled "Harvesters." It is a general object of the present invention to provide a new and improved cleaner arrangement whereby the upper end portions of beets may be cleaned more efficiently and effectively than is possible with prior art apparatus.

More specifically, it is an object of the present invention to provide a cleaner arrangement including a horizontal beater drum extending at such an angle with respect to the direction of travel of the supporting vehicle that a more effective cleaning of the beets is obtained.

A further object of the present invention is to provide a cleaner arrangement including a rotatable beater drum which is mounted for relatively free up and down movement together with means for automatically positioning the periphery of the beater drum with respect to the upper end portions of beets passing relatively therebeneath.

A further object of the present invention is to provide a novel pivotal support and drive arrangement for beet cleaner drums. A further specific object of the invention is to provide a novel counterbalancing arrangement for pivotally adjustable beet cleaner drums.

In accordance with the preferred embodiment of the invention, the cleaner arrangement consists of an elongated rotatable beater drum mounted for rotation about a horizontal axis, the opposite ends of the drum being journaled in the lower end of a frame pivotally supported upon a shaft which is in turn mounted upon the harvester frame. The axis of the drum extends at an acute angle with respect to the longitudinal direction of the harvester. Counterbalancing spring means are operatively connected to the supporting frame of the beater unit to counterbalance the greater portion of the weight of the beater unit and its pivotal supporting frame. A locator shoe connected to the supporting frame of the beater unit is arranged ahead of the beater unit and which, upon engagement therewith of the upper end portion of a beet, automatically positions the beater unit with respect thereto for effecting a thorough cleaning of the upper end of the beet passing relatively beneath the beater unit.

Additional objects and advantages of the present invention will be pointed out in the following description taken in connection with the accompanying drawings while the features of novelty will be set forth more specifically in the claims annexed to and forming part of the present disclosure.

In the drawings, Fig. 1 is a side elevation of the front end portion of a harvester vehicle showing, in particular, the details comprising my present invention in the preferred embodiment thereof;

Fig. 2 is a plan view of the structure shown in Fig. 1;

Fig. 3 is a diagrammatic or explanatory view of the beet cleaning apparatus with parts removed taken generally along line 3—3 of Fig. 1 and showing a typical operation of the apparatus.

Referring now particularly to Figs. 1 and 2 of the drawings, the front end portion of a harvester vehicle or tractor is shown comprising a motor housing 10, a longitudinal frame 11, a front axle 12 and front wheels 13. A pair of forward frame extensions 14 and 15 extend forwardly of the tractor, being suitably secured at their rear ends to the tractor frame 11. Mounted upon the forward end of the extension frame members 14 and 15 is a conventional topper arrangement shown in dotted lines and indicated generally at 17. The topper includes a cutter element 18 which is operative for severing the major portion of the top leaves from beets such as that indicated at 19. The topper is connected by a driving chain 21 to the tractor motor. The topper is preferably so adjusted that the cutter 18 will not cut substantially into the beet body with the result that many smaller leaves or appendages growing from the top and from around the side portions thereof below the crown are left adhering to the beet together with other debris including dirt at shown at 20. The apparatus as thus far described forms no part of the present invention and reference is made thereto only for purposes of enabling a clearer understanding of the present invention.

The apparatus of the present invention includes an elongated beater unit comprising a multiplicity of axially spaced apart flexible flail elements 25 mounted upon the shaft 26. Neither the details of construction of the flail elements 25 nor their mode of attachment to the shaft 26 is important insofar as the present invention is concerned since such details are well known in the art and adequately disclosed, for example, in the patents mentioned above. The flails 25 are arranged in rows, preferably four in number arranged in a balanced relation about the shaft 26. As mentioned, the flails 25 are of flexible material and, particularly under centrifugal force, they will extend outwardly from the shaft 26 in the radial direction but upon contact with the tips of the flails with the upper end portion of the beets, the flails will flex sufficiently so as not to cut into the body of the beets but, at the same time, the flails will be stiff enough to whip or flick the appendages and other debris 20 from the tops of the beets.

The opposite ends of the shaft 26 are journaled for rotation in suitable bearings 29 and 30 provided at the lower ends of bracket frame members 31 and 32, respectively. The bracket frame members are suitably stiffened and braced apart by a transverse member 33. A semi-cylindrical hood 34 is provided between the frame members 31, 32 and which extends over the top of the beater unit so as to deflect downwardly the debris whipped up by the flails 25 of the beater unit.

The beater unit is mounted for free or floating up and down movement. In the arrangement shown, the upper ends of the frame members 31 and 32 are journaled upon bracket members 36 and 37, which are in turn rigidly secured to and supported from the vehicle frame. For supporting the outward bracket 36 a lateral frame extension is provided including outwardly extending frame members 40, 41 and 42 (Fig. 2), the outer ends of which are connected together by means of a longitudinally extending member 43.

A driving connection is made to the beater unit from the power take-off shaft 45 of the tractor motor by means of a drive chain 46 extending between a sprocket provided upon the shaft 45 and a second sprocket provided upon the shaft 47. The shaft 47 is journaled at its opposite ends by means of bearings 48 and 49 mounted on the vehicle frame and on the lateral frame extension member 43, respectively. Mounted upon the shaft 47 are a plurality of V-pulleys 51 and which are connected by V-belts 54 to V-pulleys 55 mounted upon the shaft 52. The shaft 52 extends through the pivotal supporting journals for the upper ends of the frame members 31 and 32 and a sprocket 57 is provided on the outermost end thereof and which is connected by chain 53 to a second sprocket 58 provided upon the end of the beater unit shaft 26.

For reasons as will be pointed out more fully hereinafter, the horizontal axis of the beater unit, or shaft 26, is arranged at an acute angle with respect to the longitudinal direction of the harvester vehicle. As shown in Fig. 2, the angle A between the longitudinal direction of the harvester frame and the direction of the shaft 26 is approximately 70 degrees and which I have determined as being most suitable for this apparatus. As will be pointed out more fully subsequently, however, this angle is not critical and may be varied considerably though it should not be greater than about 80 degrees, nor less than about 10 degrees. The shaft 52 extends parallel with the shaft 56 and since the shaft 47 is parallel with shaft 45 the V-belts interconnecting the shafts 47 and 52 must make a slight change of direction. Inasmuch as the angle of relative angularity between the shafts 47 and 52 amounts to only twenty degrees and since the shafts 47 and 52 are spaced apart a considerable distance vertically the relative angular displacement between the axis of rotation of the belt pulleys is not excessive for efficient power transmission therebetween. For this, and for other reasons to be subsequently pointed out, it is preferred that the angle A be maintained as large as possible.

Means are provided for counterbalancing the beater unit and the pivotal supporting frame structure therefor so that the beater and frame will be suspended in a substantially but not completely balanced relation beneath the harvester frame. As shown in the drawings, the counterbalancing arrangement provided in this instance consists of a pair of springs 60 arranged between the transverse member 61 extending between the forward frame extensions 14 and 15 and the upwardly extending lever arms 62 secured to the transverse shaft 63, the shaft 63 being journaled for rotation upon the frame members 14 and 15. A flexible cable connection 64 is provided between the upstanding lever arm 65 mounted on the outer end of the shaft 63 and the upstanding lever arm 66 rigidly fastened to the upper end of the pivotal beater unit supporting frame member 32. The tension of the springs 60 is so adjusted by means of the anchor bolts that a substantial portion, but not all, of the weight of the beater unit and supporting frame assembly is counterbalanced thereby. Accordingly, since the beater unit is not entirely balanced it will normally drop to its lowermost position relatively closely adjacent to the ground but may be moved upwardly with a relatively slight pressure exerted thereagainst. A control rod 67 connected to the upper end of a lever arm 68 secured to the outer end of the shaft 63 extends rearwardly alongside the tractor motor housing 10 toward the driver's seat at the rear end of the vehicle. The control rod 67 may be connected to a hydraulic servo-motor (not shown) whereby the beater unit may be lifted to an elevated position. Such control means associated with the rod 67 may also include a stop for limiting the lowermost extent of travel for the beater unit so that it will not drag on the ground. It will be understood that if the horizontal portion 71 of the shoe hereinafter described were permitted to drag upon the ground, the tips of the flails 25 would beat continuously into the soil. Preferably, the lower limit position of the beater unit is such that the tips of the flails 25 are spaced just slightly above ground level.

Means are provided in combination with the beater unit assembly in the form of a device for sensing the proximity of beets for automatically positioning the beater unit with respect to beets moving relatively therebeneath. As shown in the drawings, this proximity sensing or locating means comprises a shoe arranged ahead of and adjacent the lower peripheral portion of the cylindrical path of movement of the flails 25. The locator shoe comprises a plate member having an upwardly inclined forward portion 70 and a horizontal lower portion 71, the length of the plate member corresponding substantially to the length of the beater unit and supported from the beater unit frame by means of suitable bracket arms 72. The locator shoe will normally tend to slide along the surface of the ground. As the harvester proceeds along a row of beets and upon engagement of the forward end of the shoe with the upper end portion of a beet, which normally extends a considerable distance above the ground, the shoe will glide upwardly over the top of the beet thereby raising with it the beater unit. The ends of the flails 25 extend a considerable distance below the horizontal portion 71 of the locator shoe so that as the beater unit passes over the top of a beet the end portions of the flails are whipped across the top of the beet body with such a proportion of their length as is most effective for causing complete removal of appendages and cleansing of debris from the top of the beet but without causing any injury to the root. A completely cleaned beet top is indicated at 75. As the beater passes over each successive beet the supporting frame drops back down and which is important for effecting thorough cleaning of the back side of the beet, with respect to the forward direction of travel, and the beater unit is thus restored to its lowermost condition in readiness for readjustment in accordance with the height of the next following beet. It is to be understood that beets vary widely with respect to the distance of their uppermost portion from the surface of the ground and, accordingly, it is most important that the beater be raised and lowered in accordance with the height of the top of each beet. With the arrangement as shown and described the beater unit is automatically readjusted in accordance with the height of each beet contacted by the locator shoe or beet proximity sensing means.

Attention was heretofore directed to the fact that the axis of the beater extends at an acute angle somewhat less than 90 degrees with respect to the direction of travel of the harvester vehicle. This is important for the following reasons. Referring to the diagrammatic view of Fig. 3 in which the arrow 80 indicates the direction of the row of beets 77 and with the flails 25 rotating in the direction indicated by the arrow 81, it will be observed that the debris acted upon by the flails 25 is swept to one side of the row of beets, rather than rearwardly toward the colter or digging unit (not shown) of the harvester arranged immediately behind the cleaner. If the trash were thrown directly rearwardly it would foul the beet lifter points and gather upon the conveyor provided for lifting the beets removed from the ground. Moreover, the throwing of clods, rocks, dust and the like back into the tractor operator's face is eliminated and as a result he obtains better vision of the operation of the harvester units.

Another important feature of this particular arrangement is that a more efficient cleaning of the beets is accomplished. It has been definitely established by actual usage in the field that a more thorough cleaning of any beet, whether growing singly or in clusters, is effected with the flails traveling across the top of the beet at an angle substantially midway between the direction of the row or travel of the machine and right angles thereto. This is due to the fact that a greater number of flails come into actual contact with the beet and over a greater length of time than would be the case if the axis of the beater unit extended at right angles to the direction of travel of the machine. This may be further illustrated by considering the hypothetical situation in which the axis of the beater unit extended in parallel alignment with the row and in which case each beet would be engaged by each and every flail of the beater unit as the harvester moved along. The effective width of coverage of a beater so arranged would be extremely small and such an arrangement would be impractical because of the virtual impossibility of driving the machine so that each beet would pass directly beneath the axis of the beater unit and which would be necessary. Moreover, because of the fact that beets are inherently staggered more or less in the lateral direction in any row, only one side or the other of such offset beets would be cleaned. Maximum width of coverage, on the other hand, would be obtained by arranging the axis of the beater at right angles with respect to the direction of the row, but, as pointed out above, the cleaning efficiency is low with such an arrangement since only one or two flails would contact the beet. With the axis of the beater arranged at an angle between parallelism and right angles a relatively wide coverage is obtained as indicated by the distance marked at 84 in Fig. 3 while at the same time very thorough cleaning is obtained because the beet is engaged by a majority of the flails.

Then again it frequently happens that two or more beets grow together in a cluster. If the first beet of the cluster is large and extends above the remainder, by operation of the locator shoe 70, indicated by dotted lines in Fig. 3, the beater unit will be lifted but because of the diagonal arrangement of the rear edge thereof, it will drop off the edge of such forward beet considerably in advance of the engagement of the flails with all sides of the smaller or lower beet which may be positioned therebehind as indicated at 82 to effect a thorough cleaning thereof. If, however, the beater extended at right angles with respect to the direction of the row, the beater would remove only the appendages from the top of the front beet and would glide over the top of the smaller or lower beet positioned therebehind without effecting any appreciable cleaning thereof.

Viewed in another way, with the beater unit arranged at an angle shown the harvester may be driven at a faster ground speed in order to obtain the same quality of cleaning which might be obtained with the beater unit arranged at right angles to the row.

Having described the invention in what is considered the preferred embodiment thereof, it is desired that it be understood that the specific details shown are merely illustrative and that the invention may be carried out by other means.

I claim:

1. A beet cleaner apparatus comprising a wheeled supporting frame, a horizontal elongated rotatable beater unit mounted on said frame, said unit including a multiplicity of axially spaced flexible flail elements extending radially from the axis of said beater unit, the axis of said unit extending at an acute angle between 10 and 80 degrees with respect to the longitudinal direction of said frame, bracket means rotatably supporting said beater unit at the lower end, pivot means secured to said frame supporting said bracket means at the upper end, said beater unit and bracket means being movable up and down in a pivotal relation about said pivot means, a locator shoe connected to said bracket means and extending to a point ahead of said beater unit and adjacent the lower peripheral edge thereof, the rear edge of said shoe extending horizontally and substantially parallel with said axis said locator shoe being adapted to engage with the upper end portion of a beet relatively approaching said beater unit, said shoe being effective for lifting the lower end of said bracket means and said beater unit into a predetermined elevated relation with respect to the upper end of the beet passing relatively beneath said beater unit, driving connection extending to said beater unit for effecting rotation thereof whereby said flail elements upon rotation effectively clean debris from the upper end portion of the beet in passing relatively beneath said beater unit and sweep said debris laterally of the row of beets.

2. A beet cleaner apparatus comprising a wheeled supporting frame, an elongated beater unit mounted on said frame for rotation about a horizontal axis, said axis extending at an angle greater than about 10 degrees but less than 80 degrees with respect to the longitudinal direction of said frame, said unit including a plurality of axially spaced radially extending flexible flail elements, support means for supporting said beater unit in a depending relation from said frame for movement in the up and down direction, counterbalancing means operatively connected to said support means for substantially but not completely counterbalancing the weight of said beater unit and support means whereby said beater unit is biased slightly in the downward direction, a driving connection extending to said beater unit for effecting rotation thereof, and beet proximity sensing means operatively connected with said support means and adapted to sense the upper end portion of beets protruding above the ground and to adjust said beater unit upwardly to a predetermined elevated relation with respect to the upper end portion of the beet passing relatively beneath said beater unit.

3. A beet cleaner apparatus comprising a wheeled supporting frame, an elongated beater unit mounted on said frame for rotation about a horizontal axis, said axis extending at an angle greater than about 10 degrees but less than 80 degrees with respect to the longitudinal direction of said frame, said unit including a plurality of axially spaced radially extending flexible flail elements, support means for supporting said beater unit in a depending relation from said frame for movement in the up and down direction, a driving connection extending to said beater unit for effecting rotation thereof, and beet proximity sensing means operatively connected to said support means for adusting said beater unit to a predetermined elevated relation with respect to the upper end portion of the beet passing relatively beneath said beater unit.

4. A beet cleaner attachment adapted for mounting upon a tractor vehicle, said cleaner comprising an elongated beater unit mounted for rotation about a horizontal axis, said axis extending at an angle greater than about 10 degrees but less than about 80 degrees with respect to the longitudinal direction of the tractor frame, said unit including a plurality of axially spaced radially extending flexible flail elements, support means for supporting said beater unit in a depending relation from the tractor frame and for movement in the up and down direction, counterbalancing means operatively connected to said support means for substantially but not completely counterbalancing the weight of said beater unit whereby said beater unit is slightly biased by its own weight in the downward direction, a driving connection adapted to be connected to the tractor motor and extending to said beater unit for effecting rotation thereof, a locator shoe connected to said support means and extending to a point immediately ahead of said beater unit and adjacent the lower peripheral edge thereof, the rear edge of said shoe extending horizontally and parallel with said axis, said locator shoe being adapted to engage with the upper end portion of beets and for urging said beater unit upwardly to a predetermined elevated position with respect to the upper end portion of the beet passing relatively beneath said beater unit.

5. A beet cleaner apparatus comprising a wheeled supporting frame, an elongated beater unit mounted on said frame for rotation about a horizontal axis, said unit including a plurality of rows of axially spaced radially extending flexible flail elements, said rows extending at an angle greater than about 10 degrees but less than 80 degrees with respect to the longitudinal direction of said frame, means supporting said beater unit in a depending relation from said frame for free movement in the up and down direction, a driving connection extending to said beater unit for effecting rotation thereof, and beet proximity sensing means operatively connected to said supporting means for automatically adjusting said beater unit in the upward direction with respect to beets passing relatively beneath said beater unit.

READ A. WILKINSON.

REFERENCES CITED

The following references are of record in the file of this patent:

UNITED STATES PATENTS

| Number | Name | Date |
|---|---|---|
| 2,250,948 | Garst | July 29, 1941 |
| 2,468,994 | Moreau | May 3, 1949 |
| 2,505,089 | Bailey et al. | Apr. 25, 1950 |
| 2,506,054 | Agee et al. | May 2, 1950 |
| 2,528,886 | Jones et al. | Nov. 7, 1950 |